(12) United States Patent
Kwag

(10) Patent No.: US 9,515,305 B2
(45) Date of Patent: Dec. 6, 2016

(54) CONNECTOR AND BATTERY PACK INCLUDING THE SAME

(75) Inventor: Nohyun Kwag, Yongin-si (KR)

(73) Assignee: Samsung SDI Co., Ltd., Giheung-gu, Yongin-si, Gyeonngi-do (KR)

( * ) Notice: Subject to any disclaimer, the term of this patent is extended or adjusted under 35 U.S.C. 154(b) by 1207 days.

(21) Appl. No.: 13/525,600

(22) Filed: Jun. 18, 2012

(65) Prior Publication Data

US 2013/0089756 A1  Apr. 11, 2013

Related U.S. Application Data

(60) Provisional application No. 61/545,750, filed on Oct. 11, 2011.

(51) Int. Cl.
| | |
|---|---|
| *H01M 2/10* | (2006.01) |
| *H01M 2/02* | (2006.01) |
| *H01M 2/20* | (2006.01) |
| *H01M 10/42* | (2006.01) |

(52) U.S. Cl.
CPC ......... *H01M 2/1077* (2013.01); *H01M 2/1094* (2013.01); *H01M 2/20* (2013.01); *H01M 10/425* (2013.01); *H01M 2/0237* (2013.01)

(58) Field of Classification Search
CPC .. H01M 10/425; H01M 2/1077; H01M 2/20; H01M 2/1094; H01M 2/0237; H01R 9/24
See application file for complete search history.

(56) References Cited

U.S. PATENT DOCUMENTS

| | | | |
|---|---|---|---|
| 3,676,926 A * | 7/1972 | Kendall | 29/882 |
| 4,874,324 A * | 10/1989 | Andersen et al. | 439/271 |
| 7,056,137 B1 * | 6/2006 | Vall Gendre et al. | 439/271 |
| 7,794,239 B2 | 9/2010 | An | |
| 8,017,259 B2 | 9/2011 | Yang et al. | |
| 2002/0146937 A1 | 10/2002 | Yi-Tsung | |
| 2008/0076299 A1 * | 3/2008 | Gilmore et al. | 439/587 |
| 2009/0253027 A1 | 10/2009 | Yang et al. | |
| 2011/0075381 A1 | 3/2011 | Chang et al. | |
| 2011/0151303 A1 | 6/2011 | Cherng et al. | |
| 2011/0151319 A1 | 6/2011 | Cherng et al. | |
| 2012/0000409 A1 * | 1/2012 | Railey | B63B 35/79 114/55.5 |

FOREIGN PATENT DOCUMENTS

| | | | | |
|---|---|---|---|---|
| CN | 10107910 | * | 8/2007 | H01M 10/04 |
| KR | 1020070110567 | | 11/2007 | |
| KR | 1020100126961 | | 12/2010 | |
| TW | 393872 | * | 12/2010 | H01R 13/52 |

* cited by examiner

*Primary Examiner* — Patrick Ryan
*Assistant Examiner* — Aaron Greso
(74) *Attorney, Agent, or Firm* — Robert E. Bushnell, Esq.

(57) ABSTRACT

A battery pack having a connector that is designed to work outdoors or in a moist environment. The battery pack includes a case including a first case attached to a second case to enclose an inner space within, a plurality of rechargeable batteries arranged within the inner space and a connector arranged within the inner space of the case, being exposed to an outside of the battery pack to enable a device external to the battery pack to be electrically connected via the connector to the rechargeable batteries, wherein the connector is arranged to form a waterproof barrier between an outside of the battery pack and a remainder of the inner space of the case not occupied by the connector.

16 Claims, 10 Drawing Sheets

CONNECTOR AND BATTERY PACK INCLUDING THE SAME

CLAIM OF PRIORITY

This application makes reference to, incorporates the same herein, and claims all benefits accruing under 35 U.S.C. §119 from my application earlier filed in the U.S. Patent and Trademark Office on the 11of Oct. 2011 and there duly assigned Ser. No. 61/545,750.

BACKGROUND OF THE INVENTION

Field of the Invention

Aspects of the present invention relate to a battery pack having a connector having an enhanced waterproof function.

Description of the Related Art

Unlike the primary battery, the secondary battery may be recharged. A battery pack can be formed that includes a plurality of battery cells and a charge/discharge circuit. The battery pack can be used as a power source for various portable small electronic devices, such as cellular phones or camcorders, or as a power source for driving motors in hybrid electric vehicles, bicycles and the like.

Nowadays, bicycles are widely used as means for commuting to and from school or work and as a means for leisure. However, riding a conventional bicycle on an uphill incline requires a high level of physical strength and slows down the bike. For the above reasons, the use of electric bicycles is on the rise. The electric bicycle is driven by a motor, and a battery pack is employed as the power source for driving the motor of the electric bicycle.

One problem when using a battery pack in a device like a bicycle is that the battery pack can be exposed to the elements, such as moisture, and the moisture can infiltrate into the battery pack and reach the batteries and result in damage. This is a particular problem with battery packs used to power devices used outdoors, as they generally need a connector to provide electrical connection to the external device, and the connector can provide an inlet for moisture in the environment to enter into the case and damage the batteries. Therefore, what is needed is a design for a battery pack that provides a waterproof barrier about the connector to prevent moisture from infiltrating in towards the batteries, so that the battery pack can be used in outdoor electrical appliances such as electric bicycles.

SUMMARY OF THE INVENTION

Aspects of the present invention provide a battery pack that includes a connector having an enhanced waterproof function by using an ultrasonic fusion technique to form the connector.

According to one aspect of the present invention, there is provided a battery pack that includes a case including a first case attached to a second case to enclose a first inner space and a second inner space within, a plurality of rechargeable batteries arranged within the first inner space and a connector arranged within the second inner space of the case, the connector being exposed to an outside of the battery pack and being arranged to form a waterproof plug between the second inner space and the first inner space and to enable a device external to the battery pack to be electrically connected via the connector to the rechargeable batteries.

The connector may include a first cover ultrasonically fused to a second cover to form the waterproof plug. The connector may also include a first cover being formed integrally with a second cover to form the waterproof plug. The case may also include a fixing plate separating the first inner space from the second inner space. The connector further include a circuit board arranged within an inner space of the first and the second covers and a plurality of metallic terminals arranged within the inner space of the first and the second covers, the metallic terminals being fixed to the circuit board and to the second cover while being exposed to an exterior of the battery pack. Each of the second cover and the circuit board may be perforated by apertures, each of the metallic terminals being arranged within the apertures of the second cover and the circuit board.

The connector may include a plurality of fusion ribs arranged on a portion of the first cover that attaches to the second cover. The fusion ribs may extend around a periphery of an underside of the first cover. The second cover may include a base plate and a plurality of sidewalls extending upwards from corresponding edges of the base plate, wherein tops of each of the sidewalls may be attached to the first cover.

Each aperture in the second cover may include inclined sidewalls that mate with inclined surfaces of one of the terminals arranged therein. The case may include an opening having an edge that includes a fitting groove, wherein a flange portion of the second cover of the connector may be arranged within the fitting groove. The battery pack may also include a sealing part arranged between an external side of the flange portion of the connector and the fitting groove of the case to serve as a part of the waterproof plug. The fitting groove may include a first part, a second part and a third part, each of the first and third parts may be protrusions that protrude towards a center of the opening, the second part may be a groove arranged between the first and third parts. The sealing part may be arranged between an exterior part of the flange of the connector and the third part of the fitting groove. The sealing part may be an O-ring. The first case may be attached to the second case by fastening members. The first case may be attached to the second case by an interference fit between a protruding part of the first case fitted into a projection groove of the second case.

According to another aspect of the present invention, there is provided a battery pack that includes a case including a first case attached to a second case to enclose an inner space within, a plurality of rechargeable batteries arranged within the inner space; and a connector arranged within the inner space of the case, being exposed to an outside of the battery pack to enable a device external to the battery pack to be electrically connected via the connector to the rechargeable batteries, wherein the connector may be arranged to form a waterproof barrier between an outside of the battery pack and a remainder of the inner space of the case not occupied by the connector. The connector may include a first cover ultrasonically fused to a second cover to serve as a part of the waterproof barrier. The case may also include an opening having an edge that includes a fitting groove, wherein a flange portion of the second cover of the connector may be arranged within the fitting groove of the case, the battery pack may also include a sealing part arranged between an external side of the flange portion of the connector and the fitting groove of the case to serve as a remainder of the to waterproof barrier.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Throughout the specification, when it is stated herein that one part is "connected" to another part, the one part may be "directly connected" to the other part, or the one part and the other part may be "electrically connected" at respective sides of another device or element. In addition, unless explicitly described to the contrary, the words "comprise/include" or variations will be understood to imply the inclusion of stated elements but not the exclusion of any other elements.

In the following description, one and other sides mean left and right directions in each figure, respectively, and top and bottom sides mean upper and lower directions in each figure, respectively. In addition, the spatially relative descriptors used herein are relative concepts but do not limit the locations of components to those, unless expressly specified otherwise.

Example embodiments will now be described more fully hereinafter with reference to the accompanying drawings, in which embodiments of the invention are shown.

Figure 1A:
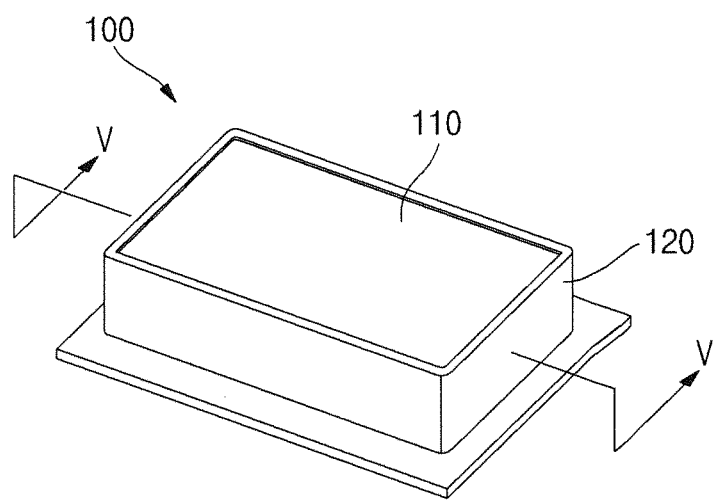
FIG. 1A is an oblique view of a connector according to an embodiment of the present invention.
Figure 1B:
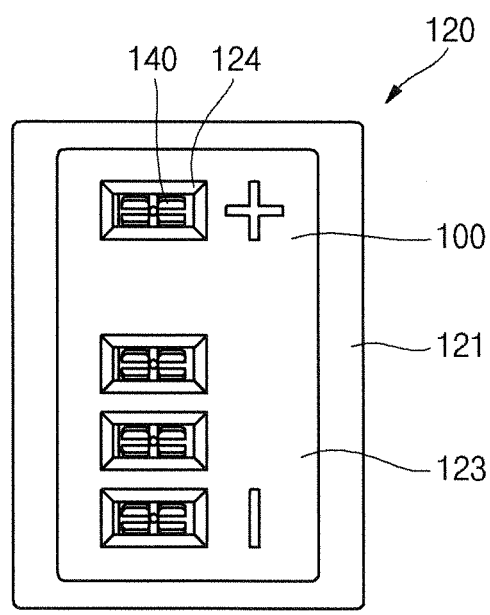
FIG. 1B illustrates a bottom view of the connector shown in FIG. 1A.
Figure 2:
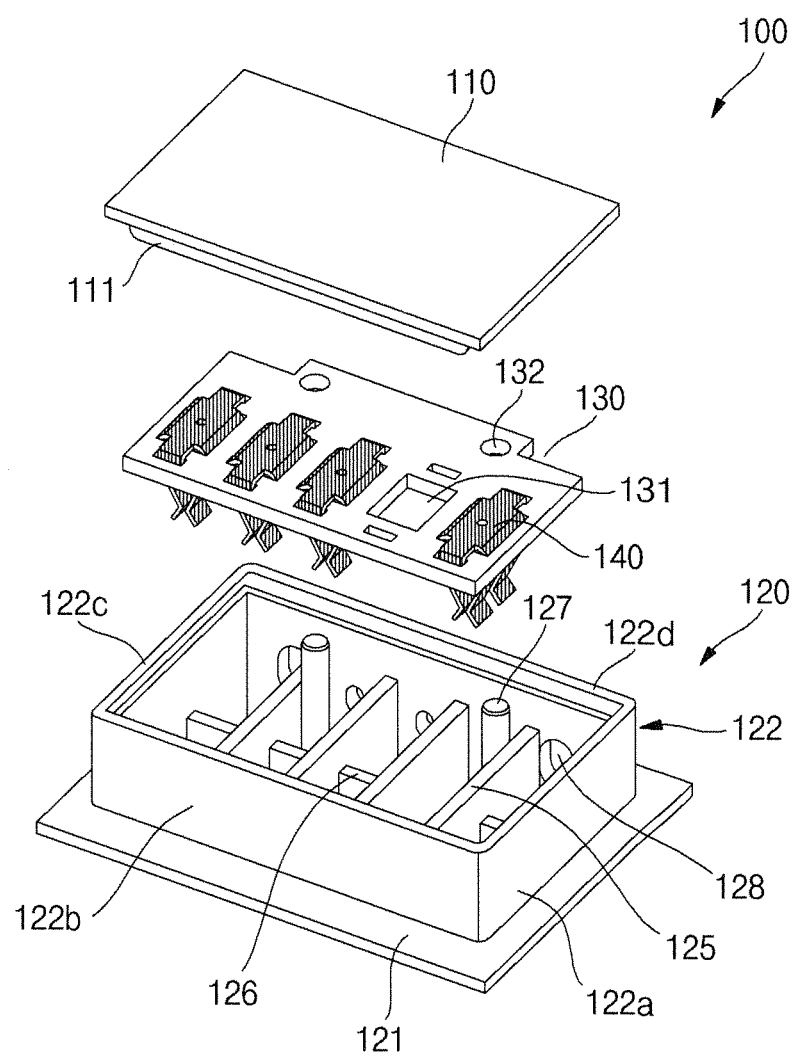
FIG. 2 is an exploded oblique view of the connector shown in FIG. 1A.
Figure 3A:
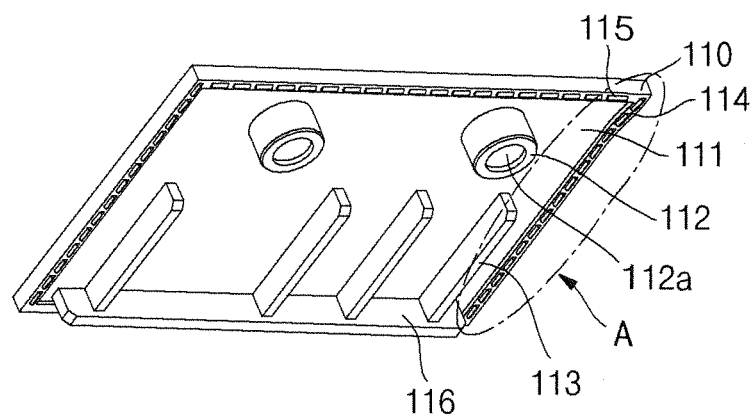
FIG. 3A is an oblique view illustrating of a bottom view of a first cover of the connector shown in FIG. 1A.
Figure 3B:
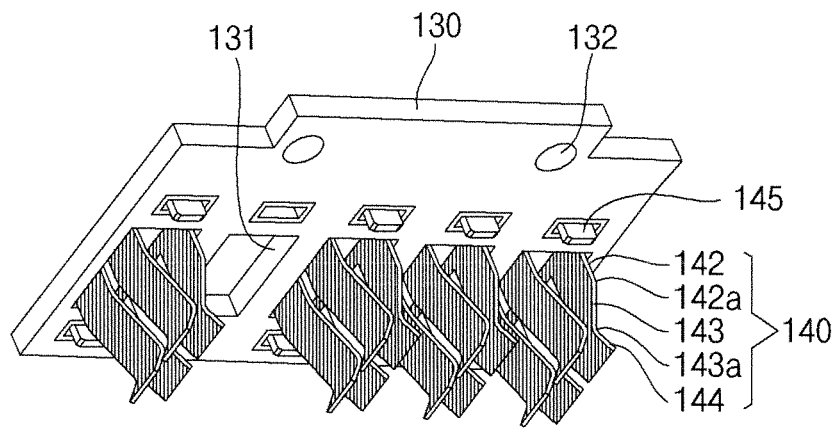
FIG. 3B is an oblique view illustrating a bottom view of a circuit board of the connector shown in FIG. 1A.
Figure 4:
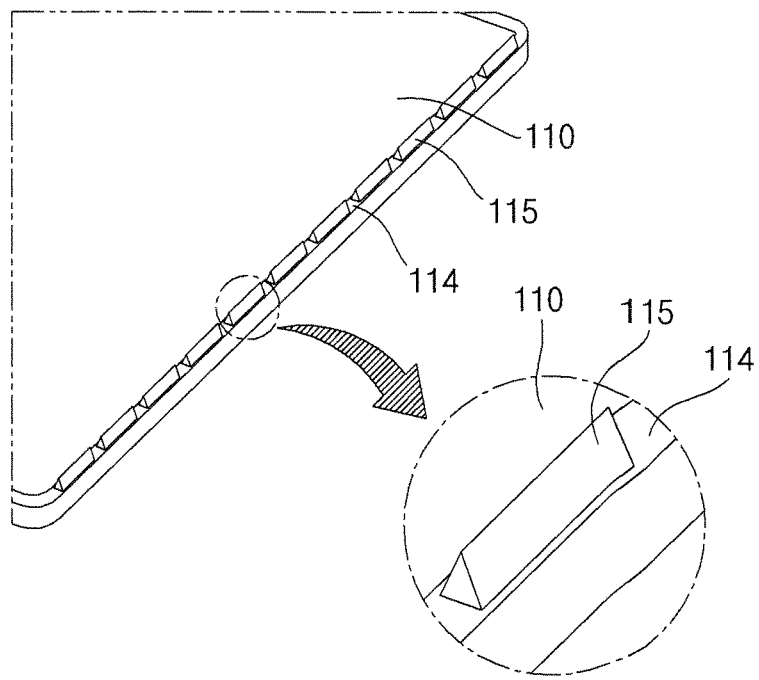
FIG. 4 is an oblique view illustrating of a bottom edge of the first cover of the connector shown in FIG. 1A.
Figure 5:
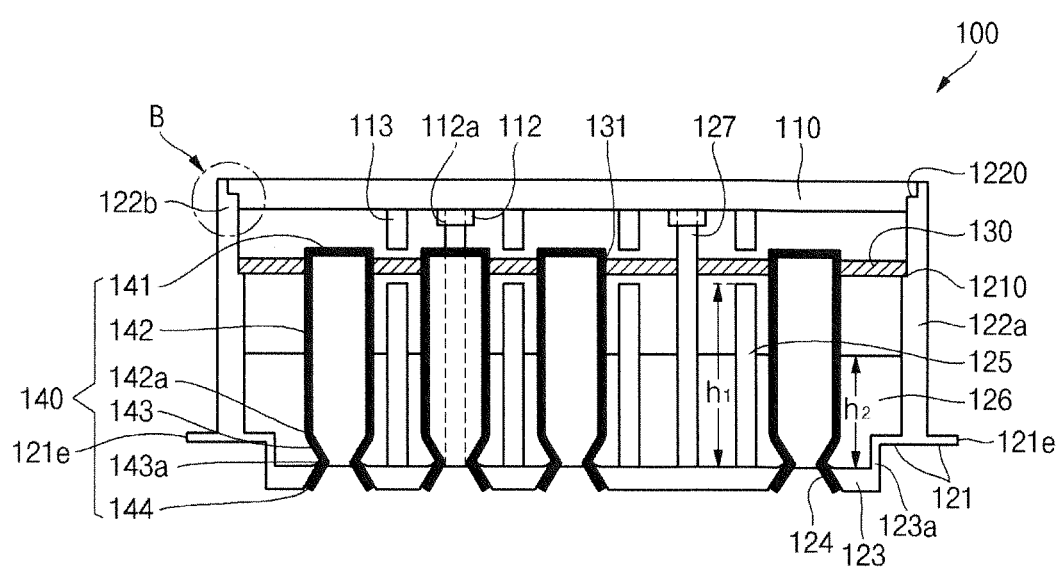
FIG. 5 is a cross-sectional view of the connector taken along line V-V of FIG. 1A.
Figure 6:
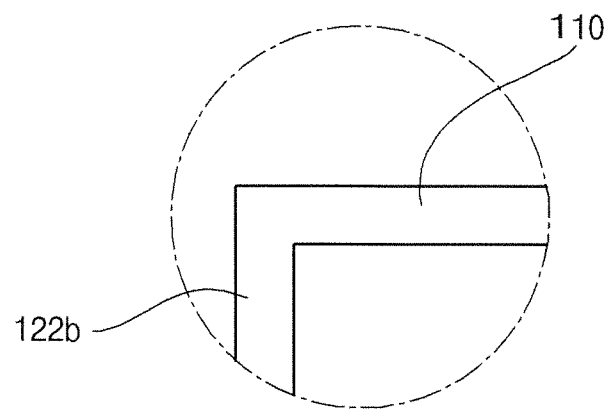
FIG. 6 is a cross-sectional view illustrating another embodiment of portion B of the connector shown in FIG. 5.

Turning now to FIGS. 1A through 6, FIG. 1A is an oblique view of a connector according to an embodiment of the present invention, FIG. 1B illustrates a bottom view of the connector shown in FIG. 1A, FIG. 2 is an exploded oblique view of the connector shown in FIG. 1A, FIG. 3A is an oblique view illustrating a bottom view of a first cover of the connector shown in FIG. 1A, FIG. 3B is an oblique view illustrating a bottom view of a circuit board of the connector shown in FIG. 1A, FIG. 4 is an oblique view illustrating of a bottom edge of the first cover of the connector shown in FIG. 1A, FIG. 5 is a cross-sectional view of the connector taken along line V-V of FIG. 1A and FIG. 6 is a cross-sectional view illustrating another embodiment of portion B of the connector shown in FIG. 5.

Referring to FIGS. 1A to 6, the connector 100 according to the embodiment of the present invention includes a first cover 110, a second cover 120 and a circuit board 130. The connector 100 is configured such that the first cover 110 and the second cover 120 are combined with each other, and the circuit board 130 is arranged within an internal space formed by the first cover 110 and the second cover 120.

The first cover 110 has the shape of a plate and is made out of a plastic material. In addition, the first cover 110 has a stepped part 111 at a bottom side and at an edge region 114 of the first cover 110. The stepped part 111 is hung on a second locking ledge 1220 formed on an inner wall of the second cover 120 to allow the first cover 110 to be fixed onto the second cover 120.

In addition, the first cover 110 has fusion ribs 115 formed at the bottom side and at the edge region 114 of the first cover 110. Here, the edge region 114 corresponds to boundary regions of the first cover 110 and the second cover 120. That is to say, the fusion ribs 115 are formed at the boundary regions of the first cover 110 and the second cover 120. As with the first cover 110, the fusion ribs 115 may be made out of a plastic material. Preferably, the fusion ribs 115 are made out of a thermoplastic resin. In the present invention, ultrasonic vibration is applied onto the fusion ribs 115 using a device such as an ultrasonic horn to crush the fusion ribs 115, thereby achieving physical fusion at the boundary regions of the first cover 110 and the second cover 120. By forming the connector 100 as such, the connector 100 can serve as a waterproof barrier to prevent external moisture from infiltrating to a portion of the battery pack where the rechargeable batteries are located.

Referring now to FIG. 6, according to another embodiment of the present invention, the first cover 110 and the second cover 120 may be integrally formed by insert-injection molding without including fusion ribs. In the arrangement of FIG. 6, since the first cover 110 and the second cover 120 are integrally formed via an insert-injection molding technique without performing physical fusion, the formation process of the connector 100 may be simplified and the waterproof barrier of the connector 100 can still be realized.

The first cover 110 has a plurality of cylindrical first projections 112 on its bottom surface. Here, the first projections 112 have projection grooves 112a arranged therein, each having a predetermined depth. The second cover 120 has a plurality of corresponding second projections 127 that pass through combining holes 132 of the circuit board 130 to then be engaged to the projection grooves 112a of the first cover 110. In the figures of the present invention, the first projections 112 are substantially cylindrical, but aspects of the present invention are not limited thereto.

In addition, the first cover 110 has a plurality of first linear projections 113 formed on its bottom surface in a first direction, that is, in a lengthwise direction. Here, the first linear projections 113 are parallel to each other in the first direction and protrude such that they are spaced apart from each other. In addition, a second linear projection 116 is also formed on a bottom surface of the first cover 110. Here, second linear projection 116 protrudes in a second direction that is perpendicular to the first direction and is arranged at one end of each of the first linear projections 113. In the present invention, a distance between the first cover 110 and the circuit board 130 can be maintained constant by including the first linear projections 113 and the second linear projection 116 on the bottom surface of the first cover 110.

The second cover 120 has an approximately box shape, has an open top and is made out of a plastic material. In other words, the second cover 120 has top sidewalls 122 formed near edges of a first plate 121 in an upwardly vertical direction. The second cover 120 has an internal space formed by the first plate 121, with the top sidewalls 122 and the circuit board 130 being accommodated within the internal space.

The first plate 121 of second cover 120 has a plate shape. As illustrated in FIG. 5, the first plate 121 has a horizontal part 123 protruding at the center of its bottom surface. The horizontal part 123 is connected to a vertical part 123a that extends from and is bent downward from the first plate 121. As illustrated in FIG. 5, the horizontal part 123 has a plurality of fixing grooves 124 formed therein. Ends of terminals 140 extending from the circuit board 130 are fixed to the fixing grooves 124 to then be electrically connected to an external device, such as an electric bicycle, an external charging device and/or communication terminals. In addition, the fixing grooves 124 are inclined inwardly with respect to the horizontal part 123. A thickness of the horizontal part 123 is greater than that of the other portions of the first plate 121 so that ends of the terminals 140 can be securely fitted into the fixing grooves 124 of horizontal part 123.

The top sidewalls 122 include first through fourth sidewalls 122a, 122b, 122c and 122d respectively extending along corresponding edges of the first plate 121. A first locking ledge 1210 and a second locking ledge 1220 are sequentially formed at interior upper regions of the top sidewalls 122 above the first plate 121. Edge portions of circuit board 130 are hung on the first locking ledge 1210 to then be fixed while the stepped part 111 arranged on the bottom surface of the first cover 110 is hung on the second locking ledge 1220 to then be fixed and produce a waterproof barrier. Thus, the first cover 110 is hung on the second locking ledge 1220 to then be fixed and is then combined with the second cover 120 at an upper region of the top sidewalls 122, corresponding to the boundary regions between the first cover 110 and the second cover 120 by fusion via an ultrasonic vibration technique.

In addition, one or more wire passing holes 128 through which wires pass therethrough are formed in one of the top sidewalls 122, such as fourth sidewall 122d, allowing connection to the circuit board 130 and to the batteries. There is waterproofing to seal wire passing holes 128 so that moisture that enters connector 100 will not reach the batteries within the case 210. For example, the waterproofing can be silicone as is well known in the art. In addition, second cover further includes plurality of first partitions 125 partitioning the internal space formed by the first plate 121 and the top sidewalls 122 into multiple regions. First partitions 125 are formed in the internal space and in an upward direction perpendicular to the top surface of the first plate 121. Here, the first partitions 125 are spaced a predetermined distance apart from each other in a lengthwise direction of the first cover 110, that is, in the first direction. The internal space partitioned by the first partitions 125 may secure a space for the terminals 140 formed in the circuit board 130 to pass therethrough.

In addition, second cover 120 further includes second partitions 126 extending in a second direction, being combined with the first partitions 125 and being arranged within the internal space formed by the first plate 121 and the top sidewalls 122. The second partitions 126 are combined with the first partitions 125 in the perpendicular direction with respect to the first partitions 125 to securely support the first partitions 125. A height h1 of each of the first partitions 125, extending from the top surface of the first plate 121, is greater than a height h2 of each of the second partitions 126.

In addition, cylindrical second projections 127 are formed in one or more regions of the internal space partitioned by the first partitions 125. The second cylindrical projections 127 are engaged with the projection grooves 112a formed in the first cylindrical projections 112 of the first cover 110. In the figures of the present invention, the second projections 127 are substantially cylindrical, but aspects of the present invention are not limited thereto.

Connector 100 further includes a circuit board 130 having a plate shape. The circuit board 130 is substantially accommodated within the internal space of the second cover 120 and the top portion of the circuit board 130 is sealed by the first cover 110. In addition, the circuit board 130 has a plurality of terminal holes 131 to allow the terminals 140 to pass through to then be fixed.

The circuit board 130 also has combining holes 132 allowing the cylindrical second projections 127 of the second cover 120 to pass therethrough. The second projections 127 of the second cover 120 having passed through the combining holes 132 are engaged with the projection grooves 112a of the first cover 110.

The terminals 140 are made out of a highly elastic copper alloy selected from phosphor bronze, beryllium copper and brass, however the present invention does not limit the material of the terminals 140 to those listed herein. Each of the terminals 140 includes an annular part 142, a first bent part 142a, a first inclined part 143, a second bent part 143a, and a second inclined part 144. The annular part 142 has a substantially oval shape, and an upper portion (that is, a top surface) 141 of the annular part 142 is placed into close contact with the top surface of the circuit board 130 to then be fixed. A lower portion of the annular part 142 extends from the upper portion 141 and passes through the terminal hole 131 to then be connected to the first bent part 142a. The first inclined part 143 is inclined inwardly from the annular part 142 passing through the terminal hole 131 to then be connected to the second bent part 143a. The second inclined part 144 is inclined outwardly from the second bent part 143a to then be fixedly fitted into the fixing groove 124 of second cover 120. The thus formed terminals 140 are placed in the space partitioned by the first partitions 125 in the second cover 120.

Meanwhile, the terminal 140 may further include an extension part 145 extending from the top surface 141 of the annular part 142 in a different direction from a direction in which the first bent part 142a is formed. The extension part 145 passes through the circuit board 130 to then be fixedly coupled to the circuit board 130.

The aforementioned connector according to the embodiment of the present invention is installed in a case accommodating rechargeable battery cells to allow the battery cells to be electrically connected to an external device, such as an electric bicycle.

Figure 7:
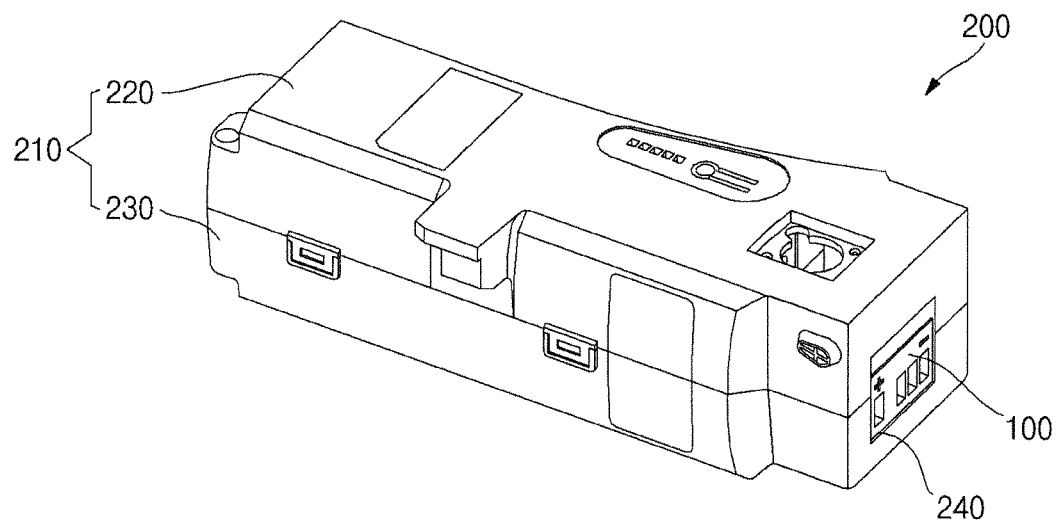
FIG. 7 is an oblique view of a battery pack according to an embodiment of the present invention.
Figure 8A:
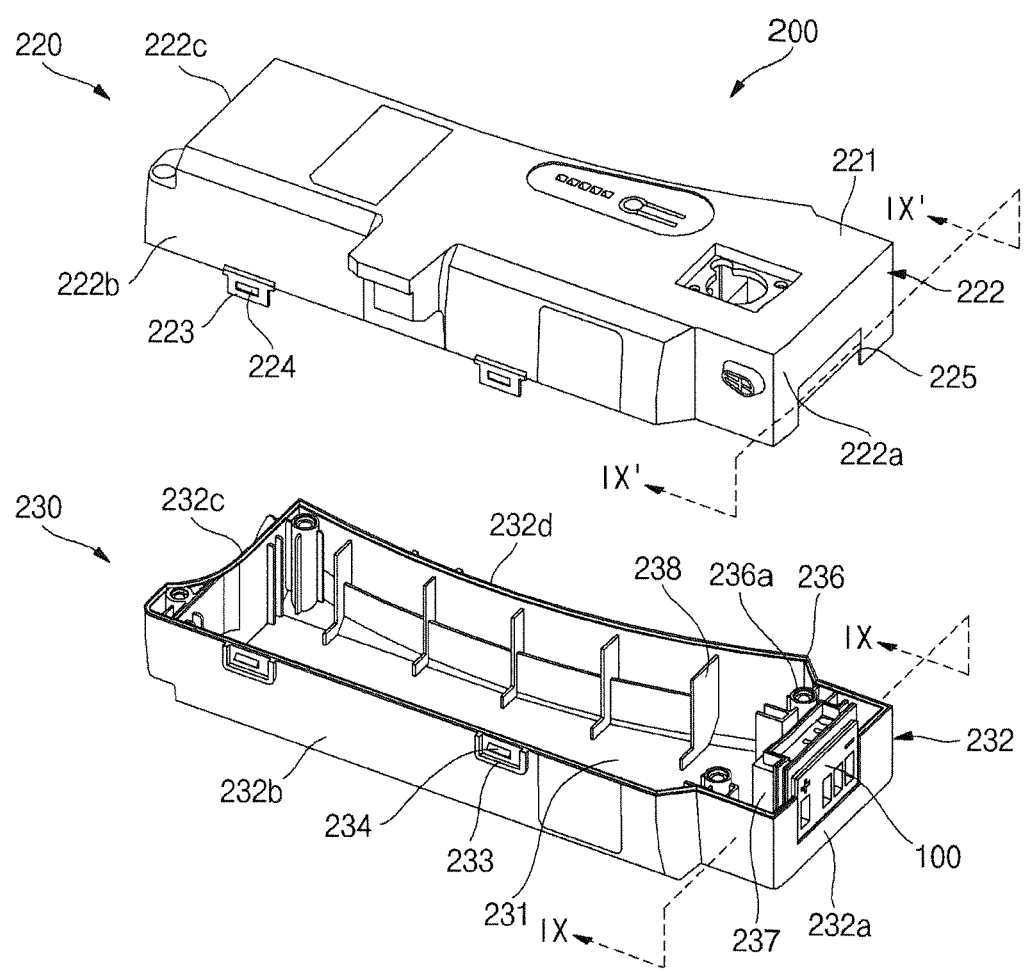
FIG. 8A is an exploded oblique view of the battery pack shown in FIG. 7 when empty.
Figure 8B:
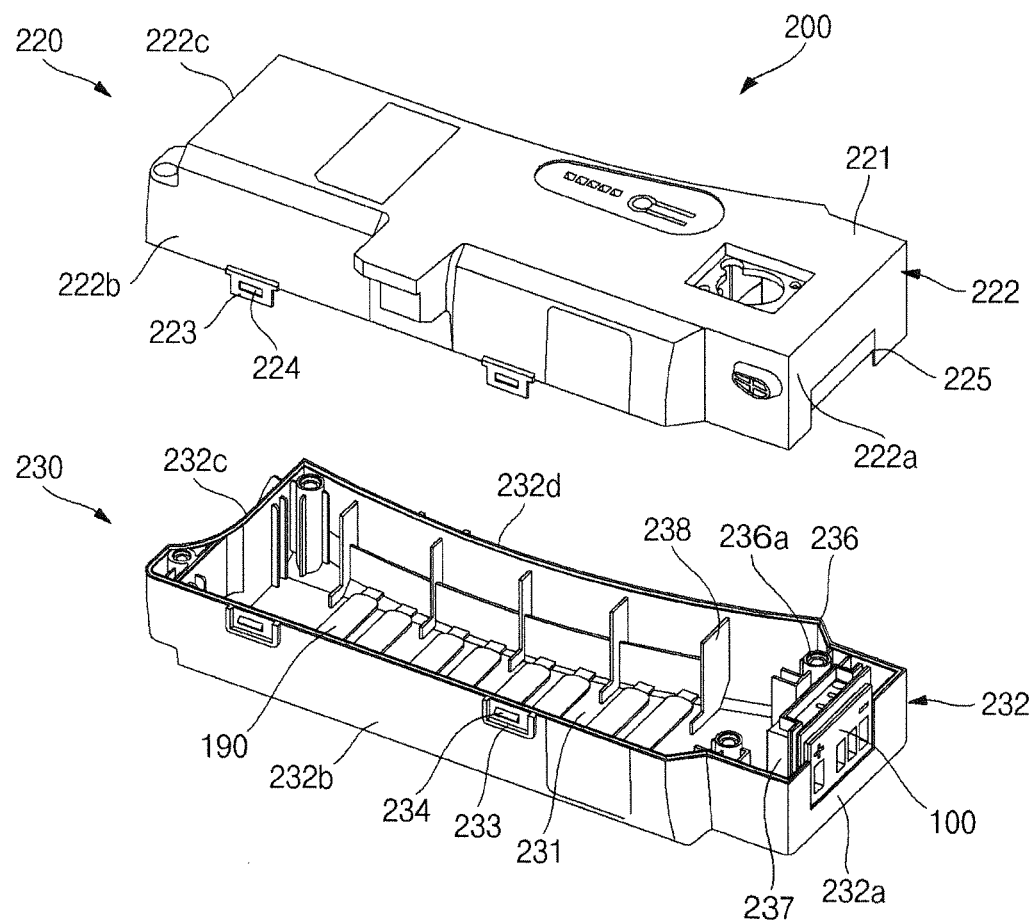
FIG. 8B is an exploded oblique view of the battery pack shown in FIG. 7 when filled with rechargeable batteries.
Figure 9A:
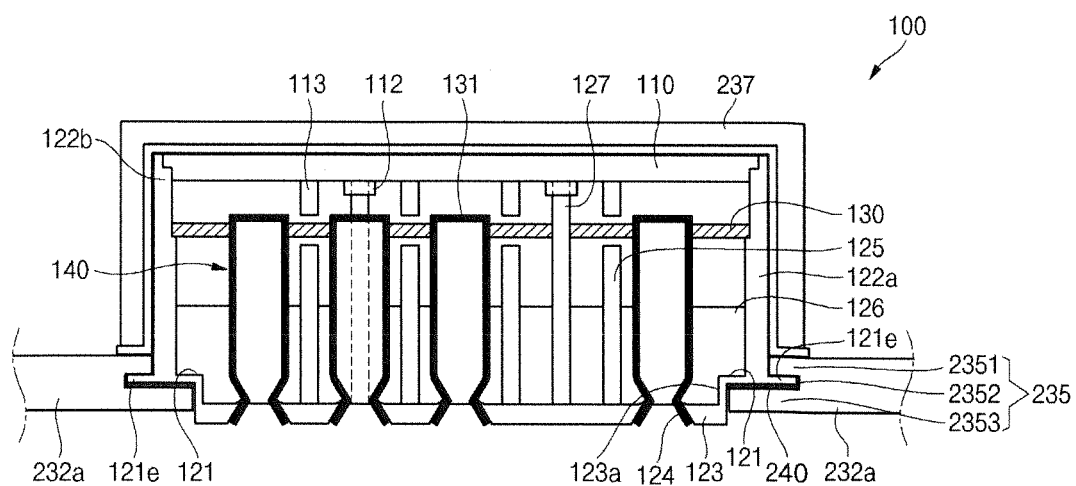
FIG. 9A is a cross-sectional view of the battery pack taken along line IX-IX of FIG. 8A.
Figure 9B:
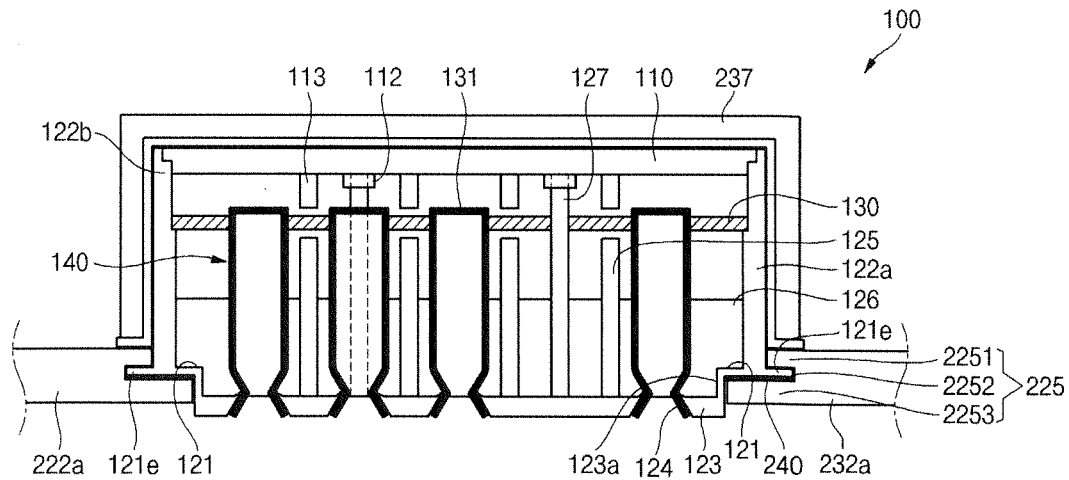
FIG. 9B is a cross-sectional view of the battery pack taken along line IX'-IX' of FIG. 8A.

Turning now to FIGS. 7 through 9B, FIG. 7 is an oblique view of a battery pack according to another embodiment of the present invention, FIGS. 8A and 8B are exploded oblique views of the battery pack shown in FIG. 7, and FIGS. 9A and 9B are cross-sectional views of the battery pack taken along line IX-IX and IX'-IX' respectively of FIG. 8A.

Referring to FIGS. 7 to 9B, the battery pack 200 according to an embodiment of the present invention includes a case 210, a connector 100 and a sealing part 240. The case 210 includes a first case 220 and a second case 230, forming an inner space within. A plurality of battery cells 190 and a battery management system (BMS) board (not shown) controlling charging and discharging of the plurality of battery cells 190 may be arranged within the inner space formed by the first case 220 and the second case 230.

The first case 220 includes a plate-shaped top plate 221 and bottom sidewalls 222 extending downward from edges of the top plate 221. The bottom sidewalls 222 include a first lower part 222a, a second lower part 222b, a third lower part 222c and a fourth lower part 222d. The top plate 221 has a plurality of projections (not shown) protruding in a downwardly vertical direction. The plurality of projections are engaged with projection grooves 236 of the second case 230.

Figure 11:
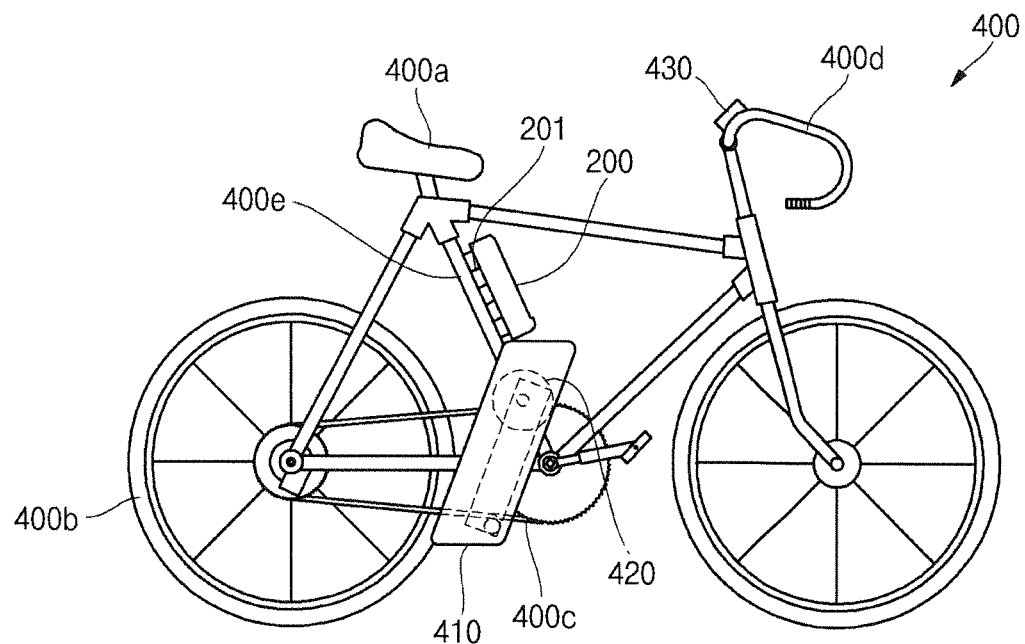
FIG. 11 is an elevation view of an electric bicycle assembled with a battery pack having a connector according to an embodiment of the present invention.

The first lower part 222a has a first fitting groove 225 into which a top portion of the edge 121e of first plate 121 of the connector 100 is fitted. In addition, the second lower part 222b has first fastening parts 223 outwardly protruding therefrom to be combined with the second case 230. Each of the first fastening parts 223 has a hook 224 that protrudes toward an outer wall of the second case 230. In addition, the fourth lower part 222d may include a fixing part 201 to be combined with an external device, such as a frame of an electric bicycle as illustrated in FIG. 11.

The second case 230 includes a plate-shaped bottom plate 231 and top sidewalls 232 extending upward from edges of the bottom plate 231. The bottom plate 231 has a plurality of cylindrical projections 236 protruding in an upwardly vertical direction. A plurality projection grooves 236a, each having a predetermined depth, are formed in the second projections 236. The projections of the first case 220 are engaged with the projection grooves 236a of the second case 230 in an interference fit manner.

As illustrated in FIGS. 9A and 9B, the bottom plate 231 of second case 230 has a fixing plate 237 to allow a first side of the connector 100 (that is, a region inserted into the inner space formed by the first case and the second case) to be fixed thereto. The fixing plate 237 is shaped to correspond to a shape of the first side of the connector 100. In the present invention, the fixing plate 237 is formed in the bottom plate 231, and the first side of the connector 100 is inserted into the inner space and comes into contact with a surface of the fixing plate 237 and is then fixed. The fixing plate 237 can divide the inner space of the case 210 into a first inner space where the rechargeable batteries 190 are located and the second inner space where the connector 100 is located.

The top sidewall 232 of second case 230 includes a first upper part 232a, a second upper part 232b, a third upper part 232c and a fourth upper part 232d. The battery cells 190 and the first side of the connector 100 are accommodated within the internal space formed by the first upper part 232a, the second upper part 232b, the third upper part 232c and the fourth upper part 232d. The batteries 190 may be arranged within the first inner space of case 210 and the connector 100 may be arranged within the second inner space of case 210. The first upper part 232a has a second fitting groove 235 into which an opposite edge 121e of first plate 121 of connector 100 is fitted.

The second upper part 232b has second fastening parts 233 located to correspond to the first fastening parts 223 of the first case 220 for combining with the first case 220. Each of the second fastening parts 233 has a hook groove 234 into which the hook 224 is inserted in an interference fit manner. The second upper part 232b or the fourth upper part 232d has a barrier 238 to maintain strength of second case 230 while partitioning a space into which the battery cells are accommodated. The barrier 238 may include a plurality of barriers to accommodate multiple battery cells in the space partitioned thereby.

The connector 100 is inserted into the case 210 such that the first side thereof faces fixing plate 237 and the second and opposite side of connector 100 faces outside of case 210. Meanwhile, like the connector 100 shown in FIGS. 1A to 5, the connector 100 according to the embodiment of the present invention may be configured such that boundary regions of the first cover 110 and the second cover 120 are combined together by ultrasonic fusion. Alternatively, like the connector 100 shown in FIG. 6, the connector 100 according to the embodiment of the present invention may instead be configured such that the first cover 110 and the second cover 120 may be integrally formed by insert-injection molding. The configuration and functions of the connector 100 will be omitted herein.

A sealing part 240 is formed between case 210 and a bottom surface of the connector 100 (i.e., bottom surface of first plate 121 of second cover 120 fitted into the fitting grooves 225 and 235). The sealing part 240 seals spaces between each of inner walls of the first case 220 and the second case 230 and the bottom surface of the connector 100. The sealing part 240 may be an O-ring or a sealing member made out of a rubber material, but the present invention does not limit the material of the sealing part 240.

As illustrated in FIG. 9A, the fitting groove 235 of the second case 230 includes a first part 2351, a second part 2352 and a third part 2353. The first part 2351 protrudes lengthwise to come into close contact with an outer surface of a first upper sidewall 122a of the connector 100. The second part 2352 is formed in a groove shape to accommodate lateral ends or flange 121e of the first plate 121 of the connector 100. The third part 2353 protrudes lengthwise to come into close contact with an outer surface of a vertical part 123a of the connector 100. Here, a protruding length of the third part 2353 is greater than that of the first part 2351, however, the present invention does not limit the protrusion lengths of the first part 2351 and the third part 2353. Therefore, the sealing part 240 is formed to seal the bottom surface of the first plate 121 and a surface of the third part 2353 of second fitting groove 235, thereby preventing external moisture from being able to infiltrate into a space between the bottom surface of the first plate 121 and the surface of the third part 2353 of second fitting groove 235.

Turning now to FIG. 9B, the fitting groove 225 of the first case 220 is shaped to correspond to the fitting groove 235 of the second case 230. As with fitting groove 235, fitting groove has a first part 2251, a second part 2252 and a third part 2253 that corresponds to the first part 2351, the second part 2352 and the third part 2353 of fitting groove 235. As a result, a detailed description of fitting groove 225 will be omitted. Therefore, the sealing part 240 is formed to seal the spaces between the bottom surface of the first plate 121 and a surface of third part 2253, thereby preventing external moisture from infiltrating into a space between the bottom surface of the first plate 121 and the fitting groove 225.

As described above, in the battery pack according to the embodiment of the present invention, boundary regions of the first and second covers forming the connector are subjected to ultrasonic fusion or are integrally formed to produce a waterproof barrier. In addition, a sealing part is formed between the bottom surface of the connector and the third part of the fitting grooves of the first and second cases. Therefore, even if external moisture infiltrates into the battery pack, the external moisture is prevented from reaching the battery cells.

Figure 10A:
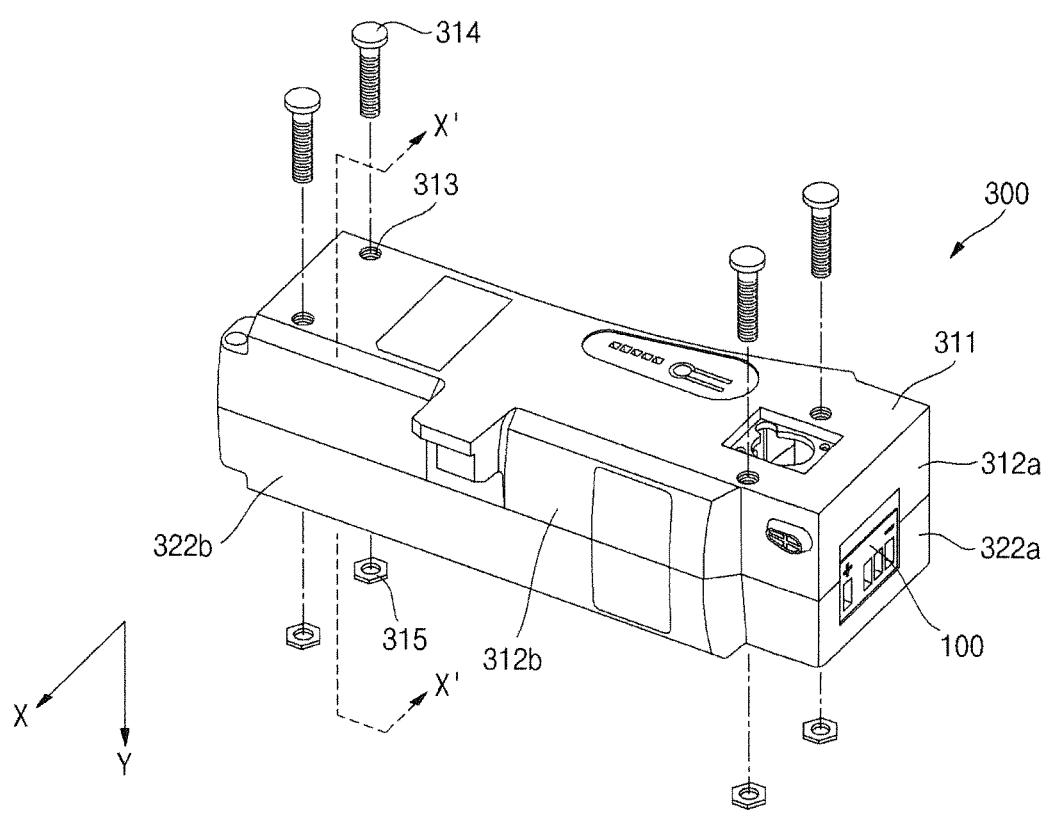
FIG. 10A is an oblique view of a battery pack according to still another embodiment of the present invention.
Figure 10B:
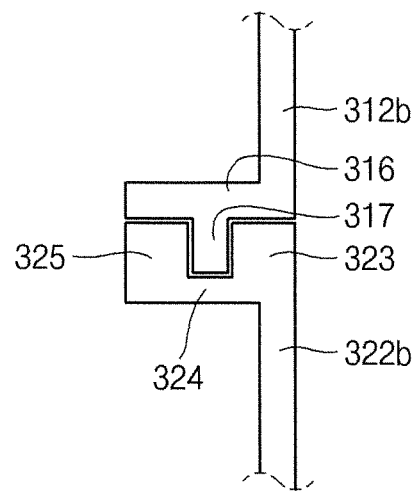
FIG. 10B is a cross-sectional view of the battery pack taken along line X-X of FIG. 10A.

Turning now to FIGS. 10A and 10B, FIG. 10A is an oblique view of a battery pack 300 according to another embodiment of the present invention and FIG. 10B is a cross-sectional view of the battery pack 300 taken along line X'-X' of FIG. 10A. Referring to FIGS. 10A and 10B, the battery pack 300 according to another embodiment of the present invention includes a third protruding part 316 outwardly protruding at a predetermined region of the second lower part 312b of the first case 310, and a fourth protruding part 317 protruding from the third protruding part 316 in a direction (e.g., in the y-axis direction) different from a direction in which the third protruding part 316 protrudes (e.g., in the x-axis direction). In the embodiment of FIGS. 10A and 10B, third and fourth protruding parts 316 and 317 are used instead of first fastening part 223, hook 224, second fastening part 233 and the hook groove 234 of FIGS. 7 to 9.

In addition, the battery pack 300 of FIGS. 10A and 10B further includes a fifth protruding part 323 outwardly protruding (e.g., in the y-axis direction) and being arranged at a predetermined region of a second upper part 322b of the second case 320, a projection groove 324 shaped to correspond to the fourth protruding part 317 and arranged in the fifth protruding part 323 and a sixth protruding part 325 extending from the projection groove 324 in the x-axis direction and arranged at one side of the projection groove 324. That is to say, the first case 310 and the second case 320 are combined with each other such that the third and fourth protruding parts 316 and 317 of the first case 310 are mated with the fifth protruding part 323, the projection groove 324 and the sixth protruding part 325 of the second case 320. Therefore, the third and fourth protruding parts 316 and 317 of the first case 310 are fitted into the fifth protruding part 323, the projection groove 324 and the sixth protruding part 325 of the second case 320 in an interference fit manner.

In addition, in the embodiment of FIGS. 10A and 10B, a first receiving groove 313 and a second receiving groove (not shown) are formed in corresponding regions of a top plate 311 of the first case 310 and a bottom plate (not shown) of the second case 320 in a vertical direction, that is, in the y-axis direction. The first receiving groove 313 and the second receiving groove (not shown) are fastened by fastening members such as bolts 314, nuts 315 or screws (not shown).

Therefore, according to the embodiment of FIGS. 10A and 10B, the third and fourth protruding parts 316 and 317 of the first case 310 are engaged with the fifth protruding part 323, the projection groove 324 and the sixth protruding part 325 of the second case 320 in an interference fit manner. Further, the first case 310 and the second case 320 are combined with each other using the fastening members passing therethrough, thereby preventing external moisture from infiltrating into battery pack 300.

Turning now to FIG. 11, FIG. 11 is an elevation view of an electric bicycle 400 assembled with a connector and battery pack 200 according to an embodiment of the present invention. Referring to FIG. 11, the electric bicycle 400 includes a motor driving circuit 410 and a motor 420. In addition, the electric bicycle 400 basically has a saddle 400a, wheels 400b, a chain 400c, a handle bar 400d and a frame 400e. Here, the frame 400e is configured to connect the saddle 400a, the wheels 400b, the chain 400c and the handle bar 400d.

The motor 420 is connected to the motor driving circuit 410 and is driven by the motor driving circuit 410. The motor 420 is a power generator that practically actuates the electric bicycle 400.

In the aforementioned electric bicycle 400, a battery pack 200 is mounted on the frame 400e, and battery cells (not shown) and a battery management system (BMS) board (not shown) are housed within the battery pack 200. Here, a fixing part 201 is arranged at one side of the battery pack 200 to mount the battery pack 200 to the frame 400e of the electric bicycle 400. In addition, the BMS board housed within the battery pack 200 includes a circuit pattern (not shown) for electrically connecting the battery cells and the electric bicycle 400, and a controller (not shown) for controlling the electrical connection. The controller is implemented in integrated circuit (IC) chips, and controls charging and discharging of the battery cells housed within the battery pack 200. In addition, the controller controls communication between the battery cells and the motor 420 of the electric bicycle 400. Further, the controller receives information concerning the battery cells or the motor 420 and display states of the battery cells or a distance to empty (DTE) of the electric bicycle 400 on a display unit 430. Since the electric bicycle 400 is operated outdoors where moisture is present, the designs for the battery pack according to the present invention prevent moisture from reaching the batteries via the connector, enabling the battery pack to work in an outdoor environment.

The present invention pertains to a battery pack having a case that encloses a plurality of rechargeable batteries, the case having an opening into which a connector is arranged, the connector being exposed to an exterior of the battery pack and serving to provide an electrical connection between the batteries and an external device. The design for the battery pack seeks to prevent external moisture from infiltrating into the case and reaching the batteries. This is achieved by providing a waterproof barrier between the connector and a remainder of the inner space of the case not occupied by the connector. With such a waterproof barrier, although external moisture may be able to enter the connector, such external moisture is prevented from reaching the batteries. As a result, the battery pack of the present invention is suitable for powering electrical devices such as electric bicycles which are used in an outdoor environment where moisture may be present.

This waterproof barrier is achieved by including two features in the design of the battery pack. The first feature is an O-ring seal part arranged at a location where the connector is fitted into the opening of the case. By including such an O-ring where the connector is attached to an opening of the case, moisture is prevented from entering the inner space of the battery pack at a location where the connector attaches to the case.

The second feature of the waterproof barrier pertains to the water tight construction of the connector. By forming the connector to be impermeable to water, even though moisture may be able to enter the connector from the outside, this moisture will be unable to enter a remainder of the inner space of the case not occupied by the connector.

In the connector design, the connector includes a first plastic piece and a second plastic piece joined together to form an inner space within, a circuit board and a plurality of metallic terminals being arranged within the inner space or the connector. The two plastic pieces can be joined together by an ultrasonic fusing technique or can instead be integrally formed by an insert injection technique to provide for the water tight construction of the connector and to serve as the second feature of the waterproof barrier of the battery pack. The circuit board and one of the plastic pieces is perforated by a plurality of apertures into which the metallic terminals are arranged and fixed thereto. The metallic terminals are exposed to an outside of the battery pack for connection to an external device, such as a charging device or a discharge device such as an electric bicycle.

Although the present invention has been described with reference to the preferred examples, the foregoing disclosure should be interpreted as illustrative only and it should be understood that various modifications and variations can be easily made by those skilled in the art without departing from the spirit of the invention.

What is claimed is:

1. A battery pack, comprising:
   a case including a first case attached to a second case to enclose a first inner space and a second inner space within, the first case being attached to the second case by fastening members;
   a plurality of rechargeable batteries arranged within the first inner space; and
   a connector arranged within the second inner space of the case, the connector being exposed to an outside of the battery pack, the connector being arranged to form a waterproof plug between the second inner space and the first inner space, the connector to enable a device external to the battery pack to be electrically connected via the connector to the rechargeable batteries.

2. The battery pack of claim 1, wherein the connector comprises a first cover ultrasonically fused to a second cover to form a portion of the waterproof plug.

3. The battery pack of claim 1, wherein the connector comprises a first cover being formed integrally with a second cover to form a portion of the waterproof plug.

4. The battery pack of claim 1, wherein the case further comprises a fixing plate separating the first inner space from the second inner space.

5. The battery pack of claim 2, wherein the connector further comprises:
   a circuit board arranged within an internal space of the first and the second covers; and
   a plurality of metallic terminals arranged within the internal space of the first and the second covers, the metallic terminals being fixed to the circuit board and to the second cover while being exposed to an exterior of the battery pack.

6. The battery pack of claim 5, each of the second cover and the circuit board being perforated by apertures, each of the metallic terminals being arranged within the apertures of the second cover and the circuit board.

7. A battery pack, comprising:
   a case including a first case attached to a second case to enclose a first inner space and a second inner space within;
   a plurality of rechargeable batteries arranged within the first inner space;
   a connector arranged within the second inner space of the case, the connector being exposed to an outside of the battery pack, the connector being arranged to form a waterproof plug between the second inner space and the first inner space, the connector to enable a device external to the battery pack to be electrically connected via the connector to the rechargeable batteries, wherein the connector comprises a first cover ultrasonically fused to a second cover to form a portion of the waterproof plug; and
   a plurality of fusion ribs arranged on a portion of the first cover that attaches to the second cover, the fusion ribs being comprised of thermoplastic resin.

8. The battery pack of claim 7, wherein the fusion ribs extend around a periphery of an underside of the first cover.

9. The battery pack of claim 5, wherein the second cover comprises a base plate and a plurality of sidewalls extending upwards from corresponding edges of the base plate, wherein tops of each of the sidewalls are attached to the first cover.

10. The battery pack of claim 6, each aperture in the second cover comprises inclined sidewalls that mate with inclined surfaces of corresponding ones of the terminals arranged therein.

11. The battery pack of claim 1, wherein the case further comprises an opening having an edge that includes a fitting groove, wherein a flange portion of a first plate of the second cover of the connector is arranged within the fitting groove.

12. The battery pack of claim 11, further comprising a sealing part arranged between an external side of the flange portion of the first plate of the connector and the fitting groove of the case to serve as a part of the waterproof plug.

13. The battery pack of claim 12, wherein the fitting groove comprises a first part, a second part and a third part, each of the first and third parts being protrusions that protrude towards a center of the opening, the second part being a groove arranged between the first and third parts.

14. The battery pack of claim 13, the sealing part being arranged between an exterior part of the flange portion of the first plate of the connector and the third part of the fitting groove.

15. The battery pack of claim 14, the sealing part being an O-ring.

16. A battery pack, comprising:
   a case including a first case attached to a second case to enclose a first inner space and a second inner space within, the first case being attached to the second case by an interference fit between a protruding part of the first case fitted into a projection groove of the second case;
   a plurality of rechargeable batteries arranged within the first inner space; and
   a connector arranged within the second inner space of the case, the connector being exposed to an outside of the battery pack, the connector being arranged to form a waterproof plug between the second inner space and the first inner space, the connector to enable a device external to the battery pack to be electrically connected via the connector to the rechargeable batteries.

* * * * *